United States Patent [19]

Kawamura

[11] Patent Number: 4,984,541
[45] Date of Patent: Jan. 15, 1991

[54] VALVE STEPPING DRIVE APPARATUS

[75] Inventor: Hideo Kawamura, Samukawa, Japan

[73] Assignee: Isuzu Ceramics Research Institute Co., Ltd., Kanagawa, Japan

[21] Appl. No.: 498,640

[22] Filed: Mar. 26, 1990

[30] Foreign Application Priority Data

Mar. 30, 1989 [JP] Japan .................................. 1-080130

[51] Int. Cl.$^5$ .............................................. F01L 9/04
[52] U.S. Cl. .............................. 123/90.11; 251/129.01
[58] Field of Search ................. 123/90.11; 251/129.01, 251/129.05

[56] References Cited

U.S. PATENT DOCUMENTS

| | | | |
|---|---|---|---|
| 3,894,275 | 7/1975 | Baumans et al. | 318/38 |
| 4,269,388 | 3/1981 | Seilly et al. | 123/90.11 |
| 4,614,170 | 9/1986 | Pischinger et al. | 123/90.11 |
| 4,779,582 | 10/1988 | Lequesne | 251/129.1 |
| 4,794,890 | 1/1989 | Richeson, Jr. | 251/129.1 |
| 4,867,111 | 9/1989 | Schneider et al. | 123/90.11 |

FOREIGN PATENT DOCUMENTS

| | | |
|---|---|---|
| 0328194 | 8/1989 | European Pat. Off. .......... 251/129.1 |
| 2377525 | 1/1978 | France . |
| 568216 | 3/1945 | United Kingdom . |
| 2053575 | 2/1981 | United Kingdom . |

OTHER PUBLICATIONS

Patent abstract of Japan, 74080, 6/81.

*Primary Examiner*—David A. Okonsky
*Assistant Examiner*—Weilun Lo
*Attorney, Agent, or Firm*—Staas & Halsey

[57] ABSTRACT

A valve stepping drive apparatus opens the suction/exhaust valve of an engine by an electromagnetic force generated by an electromagnet. A freely reciprocatable movable permanent magnet having at least a pair of magnetic poles arrayed in the direction of reciprocation is connected to the suction/exhaust valve, and fixed magnetic poles opposing the magnetic poles of the movable permanent magnet are provided and similarly arrayed in the direction of reciprocation. The suction/exhaust valve is driven, to open and close the same, by electromagnetic attractive and repulsive forces acting between the magnetic poles of the movable permanent magnet and the fixed magnetic poles. The actual operating state of the suction/exhaust valve is sensed, and when the operating state differs from a control command, the suction/exhaust valve is forcibly closed and self-diagnosis is performed.

7 Claims, 3 Drawing Sheets

VALVE STEPPING DRIVE APPARATUS

BACKGROUND OF THE INVENTION

1. Field of the Invention

This invention relates to a valve stepping drive apparatus for driving a suction/exhaust valve of an engine to open and close the valve by a linear pulse motor disposed on the shaft end portion of the valve.

2. Description of the Prior Art

A conventional apparatus for driving a suction/exhaust valve to open and close the same includes a cam shaft disposed on the upper portion or side face of the engine. A crankshaft, which is the output shaft of the engine, and the cam shaft are connected by rotary transmission means such as a belt, and the cam shaft is driven rotatively in synchronism with the rotational phase of the engine. Owing to this rotative drive, the cam face of the cam shaft pushes the shaft end face of the suction/exhaust valve via a link mechanism such as a rocker arm or pushing rod. Accordingly, the suction/exhaust valve, which is held in the closed state at all times by a spring, is opened by pushing the shaft end face of the valve.

This conventional drive apparatus for opening and closing the suction/exhaust valve results in a large-size engine because the cam shaft and link mechanism must be added to the engine.

Furthermore, since the cam shaft and link mechanism are driven by the output shaft of the engine, some of the engine output is consumed by frictional resistance when the cam shaft and link mechanism are driven. This diminishes the effective output of the engine.

Further, the actuation timing of the suction/exhaust valve cannot be altered during engine operation. Therefore, the valve actuation timing is adjusted in such a manner that a high output will be attained when the engine is running at a prescribed rotational speed. As a result, engine output and efficiency decline when the engine is running at an rpm different from the prescribed rpm.

In order to solve the foregoing problems, an apparatus for driving a suction/exhaust valve by connecting a magnetic body to the shaft end portion of the suction/exhaust valve and attracting the magnetic body by a fixed electromagnet has been disclosed in Japanese Patent Application Laid-Open (KOKAI) Nos. 58-183805 and 61-76713.

However, with the disclosed electromagnet arrangement in the apparatus described in these two publications, the distance between the electromagnet and the magnetic body varies with movement of the suction/exhaust valve, and the electromagnetic force acting between the electromagnet and the magnetic body suddenly changes Consequently, the operation of the suction/exhaust valve becomes highly unstable.

SUMMARY OF THE INVENTION

Accordingly, an object of the present invention is to provide a valve stepping drive apparatus in which drive for opening and closing a suction/exhaust valve of an engine is performed by a linear pulse motor disposed on a shaft end portion of the suction/exhaust valve, whereby the opening/closing operation can be performed stably even when the suction/exhaust valve moves.

In accordance with the present invention, the foregoing object is attained by providing a valve stepping drive apparatus comprising a movable permanent magnetic connected to a suction/exhaust valve and having a pair of magnetic poles arranged in a direction in which the suction/exhaust valve is reciprocated, fixed magnetic poles opposing the magnetic poles of the movable permanent magnet and arranged to have a spacing different from a spacing between the magnetic poles of the movable permanent magnet, fixed excitation coils wound on respective ones of the fixed magnetic poles for exciting the fixed magnetic poles, and energizing control means for controlling passage of current through the fixed excitation coils so that an electromagnetic force acts between the magnetic poles of the movable permanent magnet and the fixed magnetic poles, thereby driving the suction/exhaust valve to open and close the same.

Accordingly, the valve stepping drive apparatus of the present invention successively alternates, in a predetermined sequence, the current supplied to the fixed excitation coils, whereby the electromagnetic force acting between the magnetic poles of the movable permanent magnet and the fixed magnetic poles is made to coincide with the direction in which the suction/exhaust valve reciprocates, thereby to open and close the suction/exhaust valve.

Thus, since drive for opening and closing the suction/exhaust valve is performed by the linear pulse motor disposed on the shaft end portion of the suction/exhaust valve, the driving force acting upon the suction/exhaust valve is not changed by the opening and closing movement and the opening/closing operation can be performed stably. Furthermore, control can be performed to freely vary open/close timing, open/close stroke and open/close speed while the engine is running.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the drawings.

Figure 1:
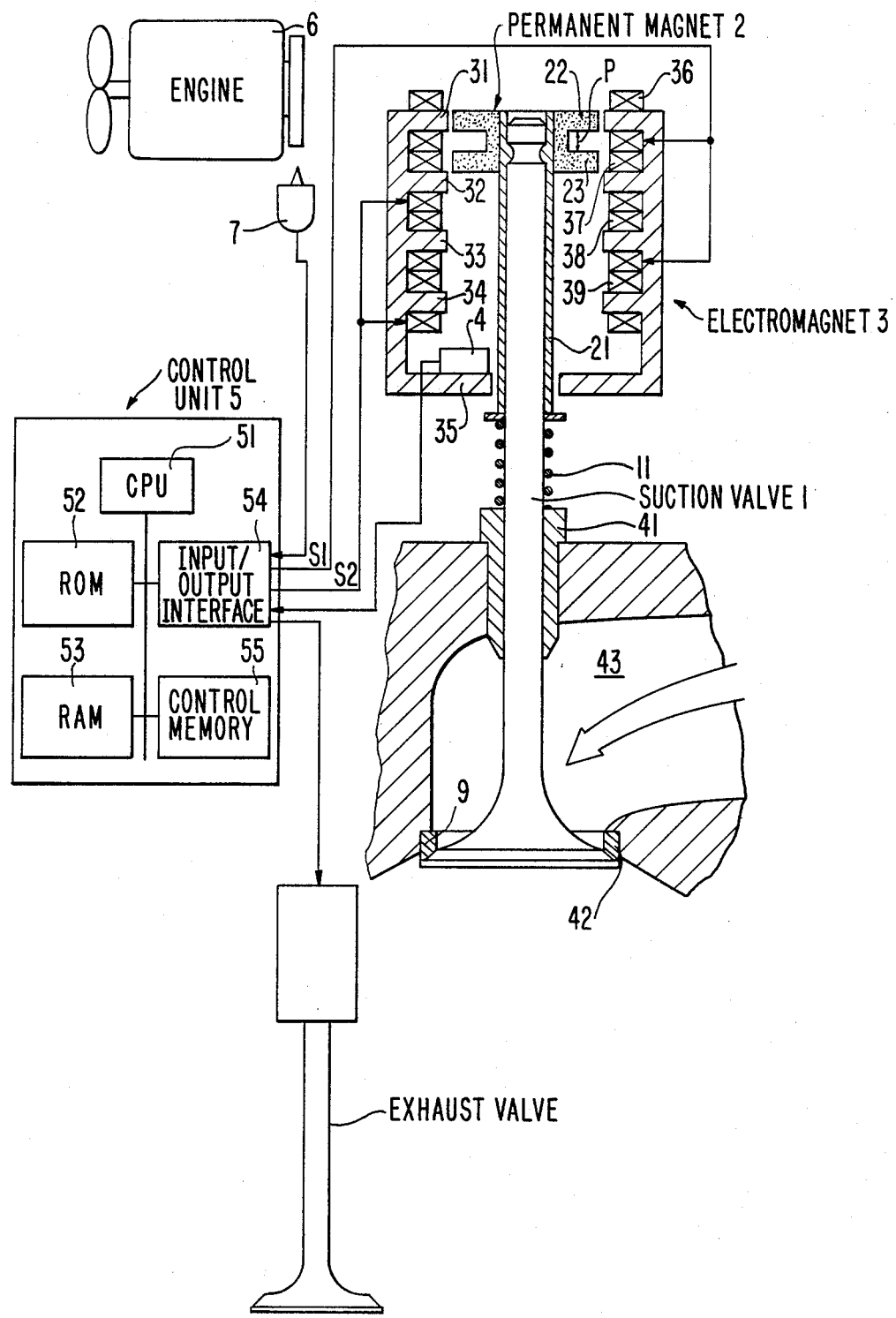
FIG. 1 is a block diagram illustrating an embodiment of the present invention.

In FIG. 1, numeral 6 denotes an engine having an output shaft in the vicinity of which is disposed a rotation sensor 7 for sensing the rotational speed and rotational phase of the engine 6 and converting sensed speed and phase into electric signals.

Suction valves and exhaust valves for controlling the opening and closing of suction and exhaust ports are disposed within the engine 6. However, since the drive apparatus of the present invention is applicable to both suction valves and exhaust valves, it will be described hereinafter principally with regard to a suction valve.

Numeral 1 denotes a suction valve consisting of a heat-resistant, high-strength, light-weight material such as a ceramic. The suction valve 1 is axially supported by a valve guide 41 so that its shaft portion may reciprocate freely.

A valve seat 9 is disposed at a suction port 43, which is the terminus of an exhaust conduit. A beveled portion 42 of the suction valve 1 and the valve seat 9 are in intimate contact to close the suction port.

The shaft end side of the shaft portion of suction valve 1 is sheathed by a magnetic passageway 21 comprising a cylindrical magnetic body. A circular movable permanent magnet 2 is fitted onto the outer periphery of the magnetic passageway 21 on the shaft end side thereof.

The movable permanent magnet 2 has a magnetic pole 22 on the N-pole side and a magnetic pole 23 on the S-pole side. The poles 22, 23, which are disposed on the outer periphery of the magnet 2, are separated from each other by a spacing P in the axial direction of the suction valve 1.

An electromagnet 3 is disposed circumferentially of the suction valve 1 and comprises a yoke member, which includes four fixed magnetic poles 31, 32, 33, 34, spaced apart by (3/2)P, opposing the magnetic poles 22, 23 of the movable permanent magnet 2 and arrayed in a row in the direction of movement of the movable permanent magnet 2, as well as a lower magnetic pole 35 opposing the outer peripheral surface of the magnetic passageway 21, and fixed excitation coils 36, 37, 38, 39 wound on the fixed magnetic poles 31, 32, 33, 34, respectively.

Among the fixed excitation coils 36, 37, 38 and 39, the coils 36, 38 are wound in mutually opposite directions, and so are the coils 37, 39.

A spring 11 is provided between the magnetic passageway 21 and valve guide 41 to prevent the suction valve 1 from dropping when the electromagnetic 3 is not operating. A position sensor 4 is provided on the lower magnetic pole 35 to sense the operating position of the suction valve 1 and output a position signal The output signals of the rotation sensor 7 and position sensor 4 enter a control unit 5 via an input/output interface 54. A signal for driving the suction valve 1 is outputted to the fixed excitation coils 36, 37, 38, 39 via the input/output interface 54. A signal S1 is delivered to the fixed excitation coils 36, 38 and a signal S2 is delivered to the fixed excitation coils 37, 39.

The control unit 5 includes, in addition to the input/output interface 54, a RAM 53 for temporarily storing data and the results of processing, a ROM 52 for storing programs and various maps, a CPU 51 for executing processing in accordance with programs stored in the ROM 52, and a control memory 55 for controlling the flow of signals within the control unit 5.

The operation of the invention constructed as set forth above will now be described.

When the rotational phase of the engine 6 sensed by the rotation sensor 7 represents the timing for opening the suction valve 1, the control unit 5 computes the open/close speed and opening of the suction valve 1, based on the maps stored in the ROM 52, from a signal indicative of the rotational speed of the engine 6 and a signal (not shown) indicative of the amount of accelerator pedal depression. The control unit 5 outputs the signals S1, S2 based on the results of this processing. In response to the outputted signals S1, S2, the suction valve 1 is driven in the opening direction, held at the position of the calculated prescribed opening and then driven in the closing direction to closing the suction port. The closed state is maintained until the next timing instant at which the valve is to be opened.

At the seating of the valve control is performed in such a manner that a force acting in the opening direction is applied to the suction valve 1 just prior to seating in order to mitigate seating shock.

When the suction valve 1 is in the driven state, the position corresponding to the states of the signals S1, S2 and the position signal from the position sensor 4 are compared. If there is a disparity between the position corresponding to the states of signals S1, S2 and the actual position, the valve is returned to the closed state by a predetermined operation and fault diagnosis is performed.

FIGS. 2(a)–(e) represent the right side of the suction valve 1 on a step-by-step basis. The fixed excitation coils 36, 37, 38, 39 are deleted from the drawings.

Since the fixed excitation coils 36, 38 are wound in opposite directions as are the fixed excitation coils 37, 39, the fixed magnetic poles 31, 33 have polarities that differ from each other at all times, and so do the fixed magnetic poles 32, 34.

Since the gap between the lower magnetic pole 35 and the magnetic passageway 21 is very small and does not change even when the suction valve 1 moves, the magnetic resistance between the electromagnet 3 and the movable permanent magnet 2 is small so that the attractive and repulsive forces between the electromagnet 3 and movable permanent magnet 2 are large. As a result, the driving force that acts upon the suction valve 1 is increased.

FIG. 2(a) shows the suction valve 1 in its uppermost position, namely the state in which the suction port is closed.

In response to the signals S1, S2, S poles are produced at the fixed magnetic poles 31, 32. As a result, the suction valve 1 is maintained at a position where balance is established between an attractive force, which acts between the magnetic pole 22 of the movable permanent magnet 2 and the fixed magnetic pole 31, and a repulsive force acting between the magnetic pole 23 of the movable permanent magnet 2 and the fixed magnetic poles 31, 32.

Next, the direction of current flow of signal S2 is reversed to change the fixed magnetic pole 32 to an N pole. When this is done, the repulsive force between the magnetic pole 23 and the fixed magnetic pole 32 changes to an attractive force, so that the suction valve 1 moves to the position shown in (b) of FIG. 2.

Figure 2:
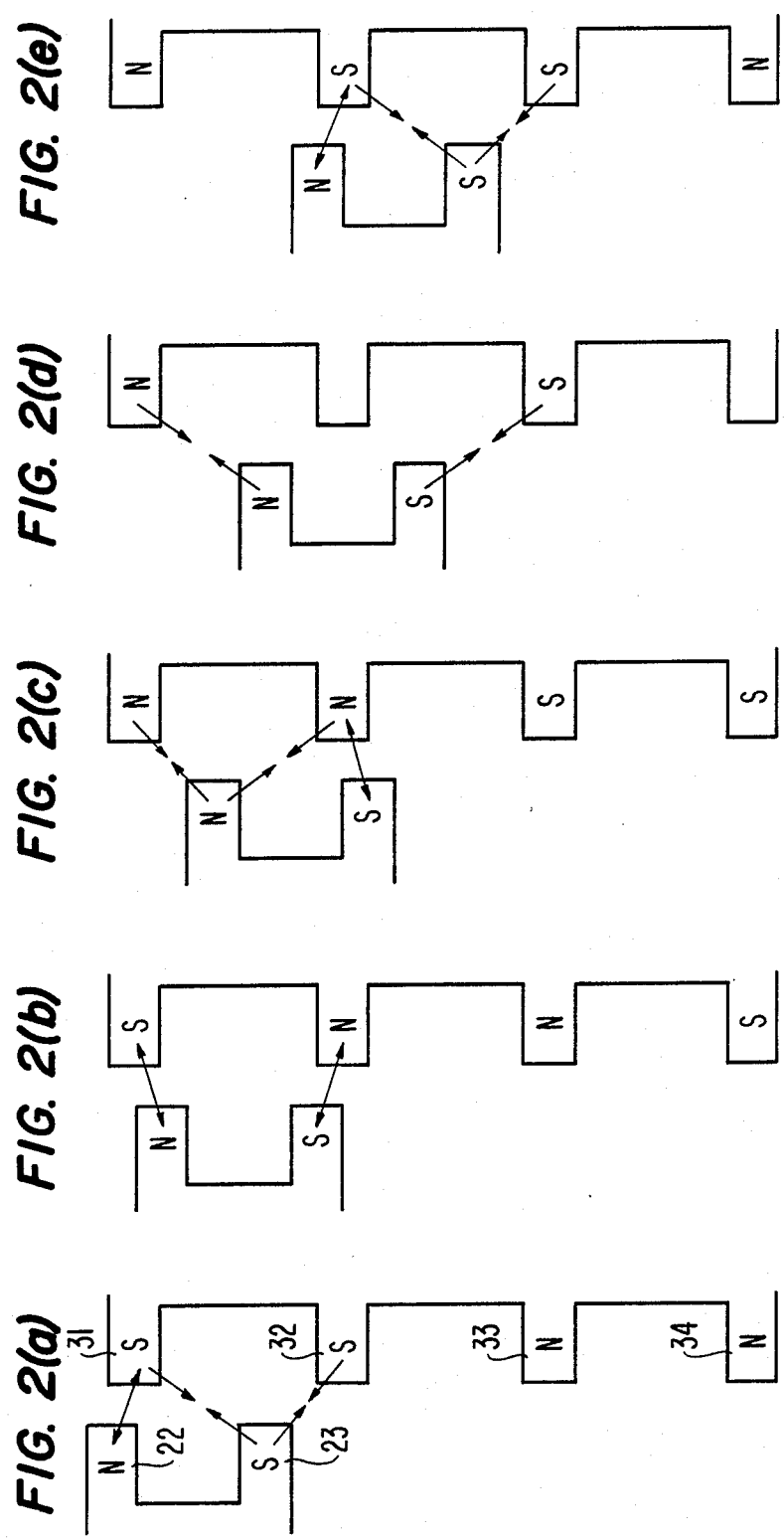
FIGS. 2(a) through (e) are diagrams showing the principle of suction valve drive.

Next, the direction of current flow of signal S1 is reversed to change the fixed magnetic pole 31 to an N pole, whereupon the attractive force between the magnetic pole 22 and the fixed magnetic pole 31 changes to a repulsive force, so that the suction valve 1 moves to the position shown in (c) of FIG. 2.

Next, the signal S2 is temporarily stopped and then reversed in direction, so that the suction valve 1 moves to the position shown in (e) of FIG. 2 upon traversing the position shown in (d) of FIG. 2.

As shown in FIG. 2, the suction valve 1 moves by ($\frac{3}{2}$)P in each of the steps of (a) through (e). Accordingly, the traveling distance of the suction valve 1 can be controlled by the number of steps The states of signals S1 and S2 in each of FIGS. 2(a) through (e) are shown in FIG. 3.

Figure 3:
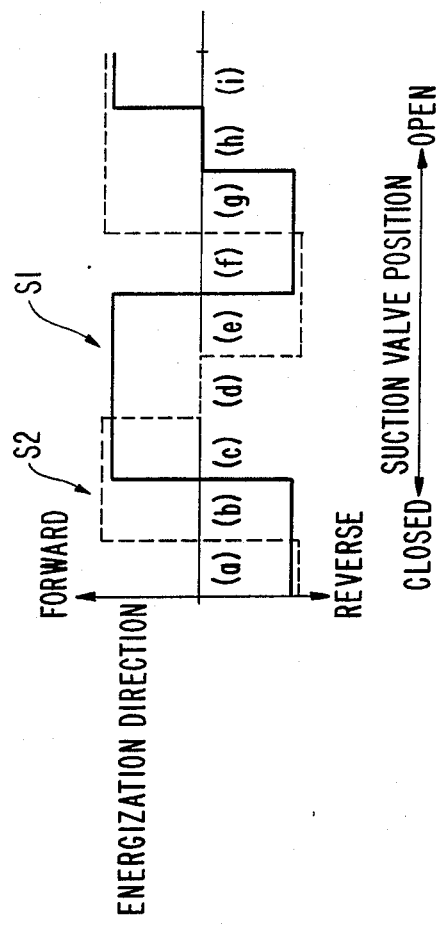
FIG. 3 is a diagram showing the energization states of signals S1 and S2.

In FIG. 3, the position of the suction valve 1 is plotted along the horizontal axis, with the rightward direction corresponding to valve opening and the leftward direction corresponding to valve closure The vertical axis represents the energization direction of the signals S1, S2. The energization direction for producing N poles in the fixed magnetic poles 31, 32 is taken as the positive direction The solid line in FIG. 3 indicates the signal S1 and the dashed line the signal S2. Further, (a) through (e) indicate the energization states corresponding to (a) through (e) in FIG. 2, and (f) through (i) indicate the energization steps which follow (a) through (e).

The energization direction is the reverse direction for both of signals S1 and S2 at (a) in FIG. 3, signal S2 changes to the forward direction and makes a transition to the state (b). Next, when signal S1 is changed to the forward direction, the state (c) is established. Then, when signal S2 is stopped, a transition is made to the state (d).

When the signal S2 is again passed in the reverse direction, state (e) is attained When signal S1 also is changed to the reverse direction, state (f) is attained.

In state (f) and state (a), the energization directions of signals S1 and S2 are the same but the position of the suction valve differs by a distance of (15/8)P.

Similarly, when signal S2 is changed to the forward direction, the state (g) is established. Then, when signal S1 is stopped, the state (h) is obtained. State (i) is established by adopting the forward direction for both signals S1 and S2.

When the energization states of signals S1 and S2 are successively changed in the (a) direction, the suction valve 1 moves in the closing direction. When the change is made in the (i) direction, the suction valve 1 moves in the opening direction.

Though the present invention has been described primarily with regard to a suction valve in the foregoing embodiment, it is obvious that the drive apparatus according to the invention can be similarly applied to a exhaust valve.

As many apparently widely different embodiments of the present invention can be made without departing from the spirit and scope thereof, it is to be understood that the invention is not limited to the specific embodiments thereof except as defined in the appended claims.

What is claimed is:

1. A valve stepping drive apparatus for driving a suction/exhaust valve of an engine by an electromagnetic force to open and close the valve, comprising:
   a movable permanent magnetic connected to a suction/exhaust valve and having a pair of magnetic poles arranged in a direction in which the suction/exhaust valve is reciprocated;
   fixed magnetic poles opposing the magnetic poles of said movable permanent magnet and arranged to have a spacing different from a spacing between the magnetic poles of said movable permanent magnet;
   fixed excitation coils wound on respective ones of said fixed magnetic poles for exciting the fixed magnetic poles; and
   energizing control means for controlling passage of current through said fixed excitation coils so that an electromagnetic force acts between the magnetic poles of said movable permanent magnet and the fixed magnetic poles, thereby driving the suction/exhaust valve to open and close the same.

2. The apparatus according to claim 1, wherein said suction/exhaust valve comprises a ceramic.

3. The apparatus according to claim 1, wherein said energizing control means causes a resultant of electromagnetic forces acting between said movable permanent magnet and said fixed magnetic poles to coincide with the opening direction of the suction/exhaust valve before said valve is seated, thereby mitigating seating shock of said suction/exhaust valve.

4. The apparatus according to claim 1, wherein a plurality of said movable permanent magnets are connected to said suction/exhaust valve.

5. The apparatus according to claim 1, wherein said fixed magnetic poles comprise several rows.

6. The apparatus according to claim 1, further including valve position sensing means for sensing traveling velocity and operating position of said suction/exhaust valve wherein said energizing control means receives a signal from said valve position sensing means and executes control to vary the traveling velocity and operating position of said movable permanent magnet.

7. The apparatus according to claim 4, wherein said fixed magnetic poles comprise several rows.

* * * * *

UNITED STATES PATENT AND TRADEMARK OFFICE
CERTIFICATE OF CORRECTION

PATENT NO. : 4,984,541

DATED : January 15, 1991

INVENTOR(S) : Hideo Kawamura

It is certified that error appears in the above-identified patent and that said Letters Patent is hereby corrected as shown below:

Col. 3, line 38, change "signal" to --signal.--

Col. 4, line 63, change "steps" to --steps.--

Col 5, line 1, change "closure" to --closure.--
     line 5, change "direction" to direction.--

FRONT PAGE [56] References Cited, 4,269,388 "3/1981" should be --5/1981--.

Signed and Sealed this

Ninth Day of June, 1992

Attest:

DOUGLAS B. COMER

*Attesting Officer*    *Acting Commissioner of Patents and Trademarks*